(12) United States Patent
Hogendoorn

(10) Patent No.: US 10,996,090 B2
(45) Date of Patent: May 4, 2021

(54) MEASURING DEVICE WITH A FLOWMETER AND METHOD FOR OPERATING A MEASURING DEVICE

(71) Applicant: Krohne AG, Basel (CH)

(72) Inventor: Cornelis Johannes Hogendoorn, Spijk (NL)

(73) Assignee: Krohne AG, Basel (CH)

( * ) Notice: Subject to any disclaimer, the term of this patent is extended or adjusted under 35 U.S.C. 154(b) by 144 days.

(21) Appl. No.: 15/454,288

(22) Filed: Mar. 9, 2017

(65) Prior Publication Data

US 2017/0268917 A1    Sep. 21, 2017

(30) Foreign Application Priority Data

Mar. 15, 2016    (DE) .................... 10 2016 104 781.3

(51) Int. Cl.
| | | |
|---|---|---|
| *G01F 1/74* | (2006.01) | |
| *G01F 15/18* | (2006.01) | |
| *G01F 15/00* | (2006.01) | |
| *G01F 1/716* | (2006.01) | |

(52) U.S. Cl.
CPC ................ *G01F 1/74* (2013.01); *G01F 1/716* (2013.01); *G01F 15/005* (2013.01); *G01F 15/185* (2013.01)

(58) Field of Classification Search
CPC ....................................................... G01F 1/716
See application file for complete search history.

(56) References Cited

U.S. PATENT DOCUMENTS

| | | | | |
|---|---|---|---|---|
| 3,314,290 | A * | 4/1967 | Peranio ..................... | G01F 5/00 73/202 |
| 4,134,294 | A | 1/1979 | Patillet et al. | |
| 4,697,147 | A * | 9/1987 | Moran .................. | G01R 33/563 324/306 |
| 5,333,496 | A * | 8/1994 | Fenelon .................... | G01F 5/00 73/202 |
| 5,463,906 | A * | 11/1995 | Spani ....................... | A61B 8/06 73/861.27 |
| 5,748,504 | A * | 5/1998 | Fletcher-Haynes ..... | G01F 1/662 702/100 |

(Continued)

FOREIGN PATENT DOCUMENTS

| | | |
|---|---|---|
| FR | 2 300 995 A1 | 9/1976 |
| JP | 11-241932 A | 9/1999 |

*Primary Examiner* — Noam Reisner
(74) *Attorney, Agent, or Firm* — Whitmyer IP Group LLC

(57) ABSTRACT

A measuring device has a flowmeter, an inlet tube and an outlet tube. The flowmeter has a measuring tube that is connected to the inlet tube and to the outlet tube. To provide a measuring device that allows for measurements using a flowmeter, in particular of the liquid components of medium in the measuring tube, independent of whether the medium is made to flow or is stagnant, wherein the measuring tube is completely filled at least with the liquid components of the medium when the medium is stagnant the inlet tube, the measuring tube and the outlet tube form a siphon, wherein the siphon is designed and aligned in respect to the vector of the gravitational field of the earth so that, when a medium initially flows through the siphon and then the flowing of the medium stops, the measuring tube is completely filled with the stagnant medium.

14 Claims, 5 Drawing Sheets

(56) References Cited

U.S. PATENT DOCUMENTS

| | | | |
|---|---|---|---|
| 7,008,793 B2* | 3/2006 | Duriez | E21B 49/08 |
| | | | 436/29 |
| 9,429,457 B2 | 8/2016 | Bousché et al. | |
| 2014/0015526 A1* | 1/2014 | Bousche | G01F 1/716 |
| | | | 324/306 |

* cited by examiner

MEASURING DEVICE WITH A FLOWMETER AND METHOD FOR OPERATING A MEASURING DEVICE

BACKGROUND OF THE INVENTION

Field of the Invention

The invention relates to a measuring device with a flowmeter, an inlet tube and an outlet tube, wherein the flowmeter has a measuring tube and the measuring tube is connected to the inlet tube and to the outlet tube. Furthermore, the invention relates to a method for operating a measuring device.

Description of Related Art

A flowmeter with a measuring tube measures the flow of a medium through the measuring tube. The medium can be either a single-phase medium or a multi-phase medium. A single-phase medium comprises a sole phase and a multi-phase medium comprises several phases. Furthermore, a medium can also include solid components. The flow of a phase through a measuring tube relates either to a volume flow or to a mass flow of the phase. When a flowmeter directly measures a volume flow of a phase, the mass flow can be calculated from the volume flow using the density of the phase. Accordingly, when a flowmeter directly measures a mass flow of a phase, the volume flow of the phase can be determined using the density of the phase.

In the measuring device, both the inlet tube as well as the outlet tube are connected to the measuring tube so that a flowing medium initially flows through the inlet tube, then through the measuring tube, and finally through the outlet tube. Thereby, the medium flows directly out of the inlet tube into the measuring tube and directly out of the measuring tube into the outlet tube.

Determining the flow of a medium through a measuring tube requires the knowledge of certain characteristics of the medium. If, for example, the medium has several phases, individualizing characteristics of the individual phases have to be known that make the individual phases differentiable for a flowmeter, so that the flowmeter can determine the portions of the individual phases in the medium and each flow of the individual phases. The characteristics are often dependent on the pressure and/or the temperature of the medium, which is why these characteristics are to be determined at the operating site of a flowmeter and cannot be determined at other locations during a calibration. The determination of these characteristics can, for example, be carried out by the flowmeter using measurements of a medium that is stagnant in the measuring tube. This, in particular, is valid for the liquid components of the medium. Due to the mounting position of the flowmeter, however, it is often not ensured at the operating site, when the medium is not made to flow through the measuring tube that the liquid components of the medium dwell in the measuring tube, so that the flowmeter can carry out measurements on the medium stagnant in the measuring tube.

SUMMARY OF THE INVENTION

An object of the present invention is thus to provide a measuring device that allows for measurements using a flowmeter, in particular of the liquid components of medium in the measuring tube, independent of whether the medium is made to flow or is stagnant, wherein the measuring tube is completely filled at least with the liquid components of the medium when the medium is stagnant.

The object is initially and essentially achieved in that the inlet tube, the measuring tube, and the outlet tube form a siphon. Thereby, the siphon is designed and aligned in respect to the vector of the gravitational field of the earth so that, when a medium initially flows through the siphon and then the flowing of the medium stops, the measuring tube is completely filled with the stagnant medium, namely at least with the liquid components of the medium. The flowing of the medium stops in the siphon, when the cause for flow in the siphon stops. Thus, the measuring device according to the invention allows that the flowmeter is able to carry out measurements on the medium stagnant in the measuring tube. The measurements are usually carried out at the temperature and/or at the pressure of the medium at the operating site of the flowmeter. In particular, the circumstance that measurements are usually carried out at the temperature of the medium at the operating site by the flowmeter is ensured in that the measurements are carried out temporally directly after the stopping of the flow of the medium through the measuring tube.

In one design of the measuring device according to the invention, it is provided that the flowmeter is a nuclear-magnetic flowmeter. A nuclear-magnetic flowmeter uses nuclear-magnetic resonance measuring methods for analysis and, in particular, for measurement of the flow of a medium through the measuring tube. Nuclear-magnetic resonance measuring methods influence the precession of atomic nuclei of a medium in the presence of a macroscopic magnetic field due to excitation of the atomic nuclei by means of a controlled magnetic field and evaluate the effect of the excitation on the atomic nuclei. A nuclear-magnetic flowmeter thus has a magnetization device for generating magnetic fields in a medium flowing through the measuring tube and has a measuring device for exciting the medium in a measuring tube and for measuring the effect of the excitation on the medium in the measuring tube.

The atomic nuclei of the elements that exhibit nuclear spin also exhibit a magnetic moment caused by the nuclear spin. The nuclear spin can be understood as an angular momentum describable by a vector and, accordingly, the magnetic moment can also be described by a vector that is parallel to the vector of the angular momentum. In the presence of a macroscopic magnetic field, the vector of the magnetic moment of an atomic nucleus aligns itself parallel to the vector of the macroscopic magnetic field generated by the magnetization device at the location of the atomic nucleus. Thereby, the vector of the magnetic moment of the atomic nucleus precesses around the vector of the macroscopic magnetic field at the location of the atomic nucleus. The frequency of precession is called Lamor frequency $\omega_L$ and is proportional to the absolute value of the magnetic field strength B. The Lamor frequency is calculated according to the relation $\omega_L = \gamma \cdot B$. Here, $\gamma$ is the gyromagnetic ratio, which is at a maximum for hydrogen atom nuclei.

A requirement for the analysis and, in particular, for the flow measurement of a medium by a nuclear-magnetic flowmeter using nuclear-magnetic resonances is that the phases of the medium to be analyzed can be excited to nuclear-magnetic resonances that are differentiable by the nuclear-magnetic flowmeter. For this, the knowledge of individualizing characteristics of the individual phases is necessary. These are, for example, the spin-spin and the spin-lattice relaxation time constants. These characteristics are normally dependent on the pressure and/or the temperature of the medium, which is why the characteristics are to be determined at the operating site of a flowmeter. The characteristics can, for example, be determined using measurements of the medium stagnant in the measuring tube by the nuclear-magnetic flowmeter.

Flow measurement can comprise the flow velocity of the individual phases of the medium and the relative portions of the individual phases in a multi-phase medium. Nuclear-magnetic flowmeters can, for example, be used for analyzing multi-phase mediums extracted from oil sources. This medium is formed essentially of the phases: crude oil, natural gas, and saltwater, wherein all phases contain hydrogen atom nuclei.

In principle, the flowmeter carries out measurements on a medium stagnant in the measuring tube directly after the flowing of the medium has stopped. This ensures that the measurements are not influenced by the individual phases of a multi-phase medium separating and influencing the measurement. In order to at least decrease the influence on measurements due to a separation of the individual phases of a multi-phase medium, it is provided in a further design of the measuring device that the measuring tube is straight, has a measuring tube longitudinal axis and the measuring tube longitudinal axis is aligned perpendicular to the vector of the gravitational field of the earth. It is ensured in this design that, after separation, the individual phases are aligned over one another in relation to the vector of the gravitational field of the earth, so that the distribution of the individual phases is constant along the measuring tube longitudinal axis, whereby measurements of the medium, in particular, by nuclear-magnetic flowmeters are not influenced in respect to a measuring volume in its entirety.

It is provided in a further design that the inlet tube and the outlet tube each have a first tube segment with a first tube segment longitudinal axis, a second tube segment with a second tube segment longitudinal axis, and a third tube segment. In each case, the first tube segment is thereby connected to the measuring tube, the first tube segment and the second tube segment are connected to one another via the third tube segment and the first tube segment longitudinal axis and the second tube segment longitudinal axis are spaced by a tube segment distance and aligned parallel to one another. The tube segment distance is thereby chosen so that, in the case of a stagnant medium, the measuring tube is completely filled at least with the liquid components of the medium.

When a medium initially flows through the inlet tube, the measuring tube, and the outlet tube, and then the cause for the flowing of the medium at least in the measuring tube stops, then the medium attempts to continue to flow due to its inertia. This can lead to the medium also flowing out of the measuring tube, so that the measuring tube is no longer completely filled when the medium is stagnant. It is thus provided in a further development of the preceding design that the tube segment distance is determined taking into account an assumed maximum flow velocity and assumed characteristics of a medium, that, when the medium initially flows through the inlet tube, the measuring tube and the outlet tube at the assumed maximum flow velocity and then the cause for the flow of the medium stops, the measuring tube is completely filled with the stagnant medium. The assumed characteristic of the medium is, for example, the density of the medium. The inertia of the flowing medium can be determined, for example, from the density of the medium and the volume of the medium in the measuring device. Thus, it is advantageous when at least the third tube segment of the outlet tube is arranged slanted so that it forms a ramp in the direction opposite the vector of the gravitational field of the earth for the flowing medium, so that the medium is decelerated.

It is provided in a further design that the inlet tube and the outlet tube each have a first tube segment, a second tube segment, and a third tube segment. Thereby, the first tube segment is connected to the measuring tube, the first tube segment and the second tube segment are connected to one another by the third tube segment and a projection of a first tube inner cross section surface of the first tube segment on a projection plane and a projection of a second tube inner cross section surface of the second tube segment on the projection plane do not intersect in the projection plane. Thus, the projection of the first tube inner cross section surface and the projection of the second tube inner cross section surface are separate on the projection plane. This ensures that a medium completely fills the measuring tube after the cause for flow of the medium has stopped and does not flow out of the measuring tube through the inlet tube or the outlet tube.

It is provided in a further design that a valve is arranged in both the inlet tube and the outlet tube or that a valve is arranged in either the inlet tube or the outlet tube in order to control the flow of a medium through the measuring tube. The valve, or valves are designed to influence the flow of a medium through the measuring tube so that the medium flows through the measuring tube or a flowing of the medium in the measuring tube stops. The valve, or valves, are thus what caused the flow of the medium to stop.

In a further development of the preceding design of the measuring device, whose inlet tube and outlet tube each have a first tube segment, a second tube segment and a third tube segment, wherein the first tube segment is connected to the measuring tube and the first tube segment and the second tube segment are connected to one another by the third tube segment, is it provided that the valve in the inlet tube and the valve in the outlet tube are arranged, in each case, in the third tube segment, or that the valve in the inlet tube or the valve in the outlet tube is arranged in the respective third tube segment.

According to a further teaching of the invention, the invention also relates to a method for operating a measuring device according to the invention. The method has the following method steps:

In a first method step, the medium is made to flow through the inlet tube, the measuring tube, and the outlet tube and measurements are carried out on the medium flowing through the measuring tube by the flowmeter. If the flowing medium is a multi-phase medium, the measurements are, for example, measurements for determining the portions of the individual phases in the multi-phase medium and/or measurements for determining the flow of the individual phases through the measuring tube.

In the second method step, the medium is not made to flow through the inlet tube, the measuring tube, and the outlet tube and measurements are carried out on the medium stagnant in the measuring tube by the flowmeter. These measurements are, for example, measurements for determining the mentioned individualizing characteristics of the individual phases of the multi-phase medium that make that individual phases differentiable for the flowmeter, so that the flowmeter can determine the portions of the individual phases in the medium and can determine each individual flow.

In a third method step, the accuracy of the measurements from the first method step is increased using the measurements from the second method step.

In detail, there is a plurality of possibilities for designing and further developing the measuring device and the method according to the invention as will be apparent from the following description of a preferred embodiment in conjunction with the accompanying drawings.

DETAILED DESCRIPTION OF THE INVENTION

Figure 1:
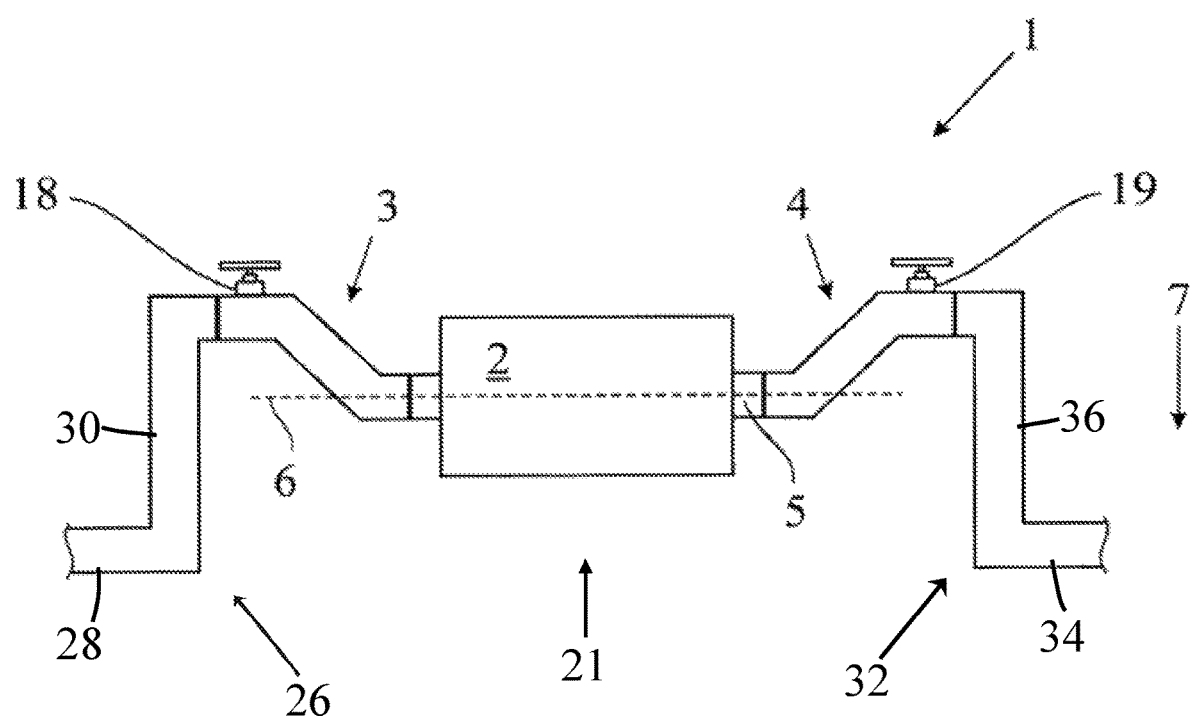
FIG. 1 shows an embodiment of a measuring device.

FIG. 1 shows the measuring device 1 with the flowmeter 2, the inlet tube 3, and the outlet tube 4, the flowmeter being a nuclear-magnetic flowmeter in this embodiment. The flowmeter 2 has a measuring tube 5 that is connected to the inlet tube 3 and to the outlet tube 4. In this embodiment, the measuring tube 5 is straight and has a measuring tube longitudinal axis 6 that is aligned orthogonally to the vector of the gravitational field 7 of the earth. An upstream tube 26 is connected to the inlet tube 3. The upstream tube 26 includes a first upstream tube segment 28 and a second upstream tube segment 30. A downstream tube 32 is connected to the outlet tube 4. The downstream tube 32 includes a first downstream tube segment 34 and a second downstream tube segment 36.

Figure 2:
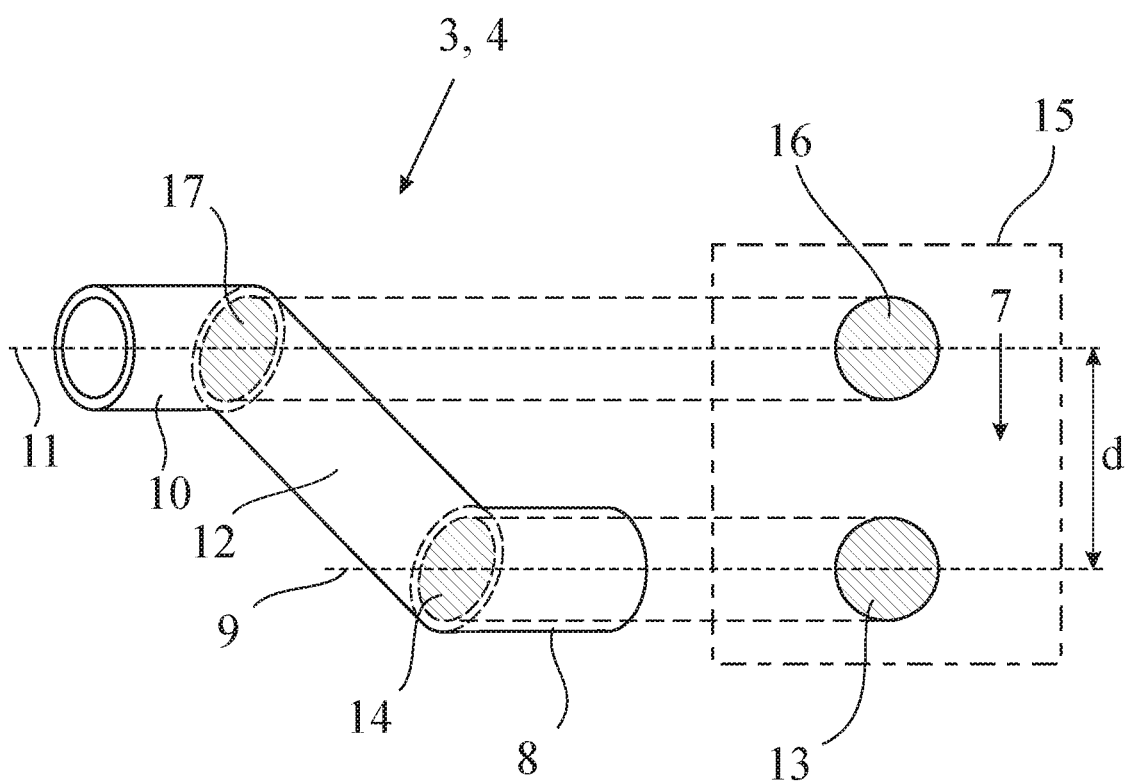
FIG. 2 is a cross-sectional view of inlet/outlet tube of the measuring device from Fig.

The inlet tube 3 and the outlet tube 4 in this embodiment are identically designed and shown in FIG. 2. They each have a first tube segment 8 with a first tube segment longitudinal axis 9, a second tube segment 10 with a second tube segment longitudinal axis 11, and a third tube segment 12. Thereby, each of the first tube segment 8 of the inlet tube 3 and of the outlet tube 4 is connected to the measuring tube 5, the first tube segment 8 and the second tube segment 10 are connected to one another by the third tube segment 12, and the first tube segment longitudinal axis 9 and the second tube segment longitudinal axis 11 are spaced along the vector of the gravitational field 7 of the earth by a tube segment distance d and are aligned parallel to one another. Furthermore, in this embodiment, the projection 13 of the first tube inner cross section surface 14 of the first tube segment 8 onto the projection plane 15 and the projection 16 of the second tube inner cross section surface 17 of the second tube segment 10 onto the projection plane 15 do not intersect in the projection plane 15. The projection plane 15 is thereby aligned along the vector of the gravitational field 7 of the earth.

In this embodiment of the measuring device 1, the valve 18 is arranged in the second tube segment 10 of the inlet tube 3 and the valve 19 is arranged in the second tube segment 10 of the outlet tube 4.

Figure 3:
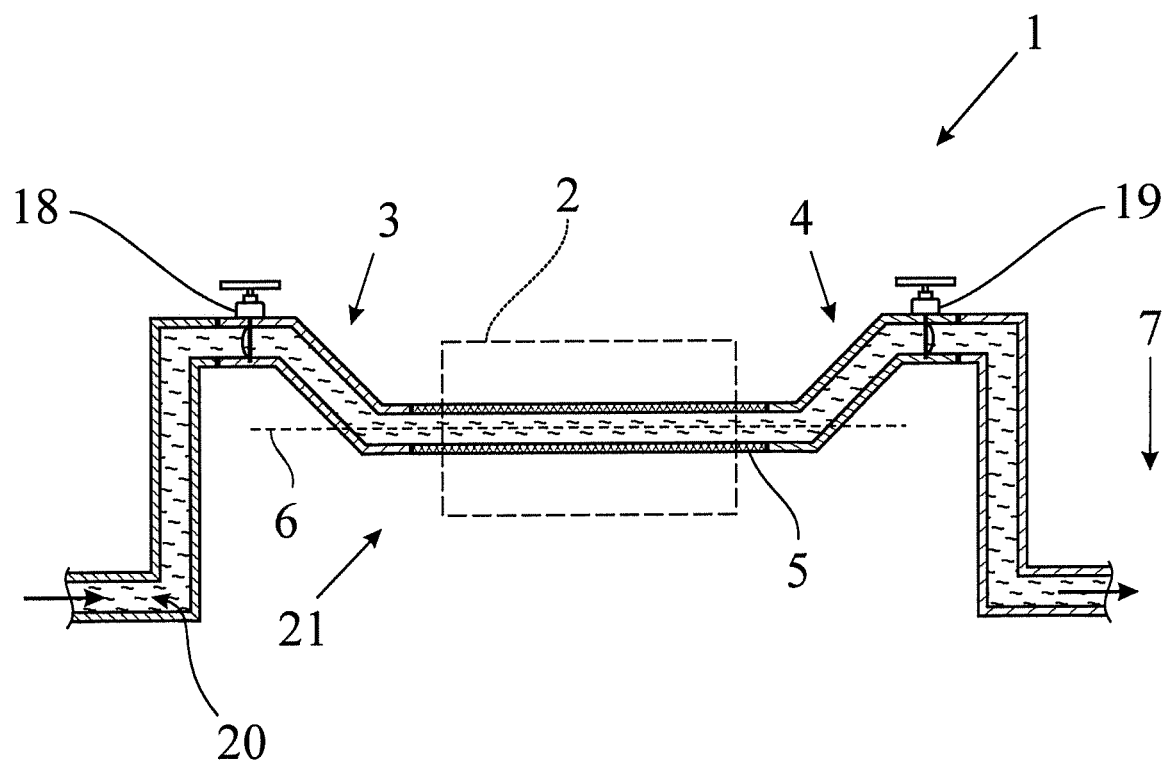
FIG. 3 is a cross-sectional view of the measuring device from FIG. 1 with a 1 with a flowing medium.
Figure 4:
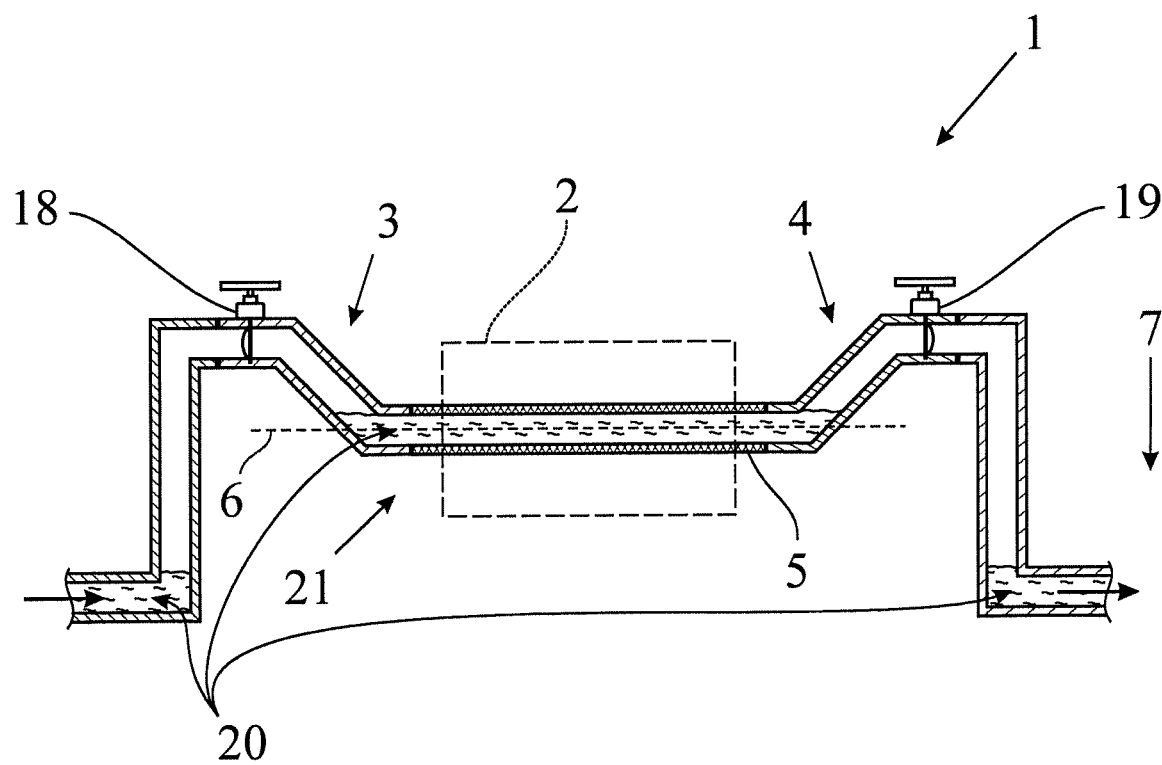
FIG. 4, is a cross-sectional view of the measuring device from FIG. 1 when flow has stopped, and
FIG. 5 a flow chart of a method in accordance with the invention.

FIGS. 3 and 4 are cross-sectional views of the measuring device and show it in operation. In FIG. 3, the medium 20 flows first through the inlet tube 3, then through the measuring tube 5 and, finally, through the outlet tube 4. FIG. 4 shows the measuring device 1 when the flowing of the medium 20 has stopped. Regardless of the embodiment of the measuring device 1, the inlet tube 3, the measuring tube 5, and the outlet tube 4 form the siphon 21. The siphon 21 is thereby designed and aligned in respect to the vector of the gravitational field 7 of the earth so that, when the medium 20 initially flows through the siphon 21 and then the cause for the flowing of the medium 20 stops, the measuring tube 5 is completely filled with the stagnant medium 20.

The tube segment distance d between the first tube segment longitudinal axis 9 and the second tube segment longitudinal axis 11 is determined taking into account an assumed maximum flow velocity with assumed characteristics of the medium 20 so that, when the medium 20 initially flows through the inlet tube 3, the measuring tube 5, and the outlet tube 4 at the assumed maximum flow velocity, and then the cause for the flow of the medium 20 stops, the measuring tube 5 is completely filled with the stagnant medium 20.

Additionally, the third tube segment 12 of the inlet tube 3 and the third tube segment 12 of the outlet tube 4 are arranged slanted in respect to the vector of the gravitational field 7 of the earth so that the tube segments 12 form a ramp for the medium 20 in a direction opposite the vector of the gravitational field 7 of the earth, so that the medium 20 is decelerated.

The valves 18, 19 thereby control the flow of the medium 20 through the siphon 21. When the valves 18, 19 are open, the medium 20 flows through the measuring tube 5, and with the valves 18, 19 closed, flow in the measuring tube is stopped.

Figure 5:
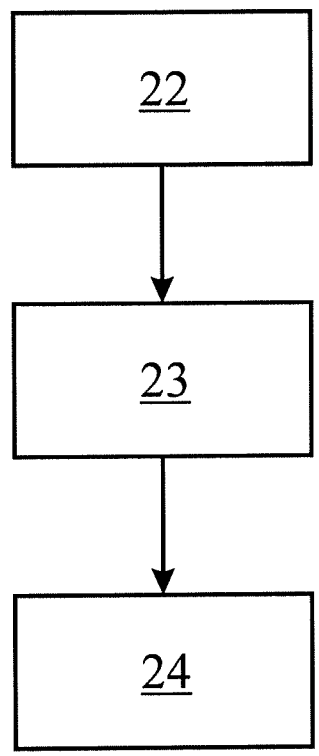

The measuring device 1 carries out the method shown in the flow chart in FIG. 5 during operation with the following method steps:

In the first method step 22, the medium 20 is made to flow through the inlet tube 3, the measuring tube 5, and the outlet tube 4 and the flowmeter 2 carries out measurements on the medium 20 flowing in the measuring tube 5. The flow of the medium 20 is thereby set by the opened valves 18, 19.

In the second method step 23, the medium 20 is not made to flow through the inlet tube 3, the measuring tube 5, and the outlet tube 4 and the flowmeter 2 carries out measurements on the stagnant medium 20 in the measuring tube 5. The medium 20 is not made to flow in that both valve 18 and valve 19 are closed.

In the third method step 24, the accuracy of the measurement from the first method step is increased by using the measurement from the second method step.

What is claimed is:

1. A measuring device, comprising: a flowmeter with a measuring tube, the flowmeter configured to perform measurements on a medium in the measuring tube; an inlet tube with a first inlet tube segment and a second inlet tube segment, the second inlet tube segment directly connected to an inlet end of the measuring tube, the first inlet tube segment positioned above the second inlet tube segment such that respective longitudinal axes of the first inlet tube segment and the second inlet tube segment are separated by a first distance in a direction parallel to a gravity vector; an outlet tube with a first outlet tube segment and a second outlet tube segment, the second outlet tube segment directly connected to an outlet end of the measuring tube, the first outlet tube segment positioned above the second outlet tube segment such that respective longitudinal axes of the first outlet tube segment and the second outlet tube segment are separated by a second distance in a direction parallel to the gravity vector; and an upstream tube directly connected to the inlet tube, the upstream tube having a first upstream tube segment and a second upstream tube segment extending between the first upstream tube segment and the first inlet tube segment, the first upstream tube segment positioned below the measuring tube of the flowmeter; wherein the upstream tube is directly connected to the inlet tube such that an entirety of the medium flowing through the upstream tube flows into the first inlet tube segment.

2. The measuring device of claim 1, wherein the respective longitudinal axes of the first inlet tube segment and the second inlet tube segment are parallel to one another; and
wherein the respective longitudinal axes of the first outlet tube segment and the second outlet tube segment are parallel to one another.

3. The measuring device of claim 1, wherein the respective longitudinal axes of the first inlet tube segment, the second inlet tube segment, the first outlet tube segment, and the second outlet tube segment are orthogonal to the gravity vector.

4. The measuring device of claim 3, wherein the measuring tube is straight; and
wherein a longitudinal axis extending between the inlet end and the outlet end of the measuring tube is orthogonal to the gravity vector.

5. The measuring device of claim 4, wherein the inlet tube includes a third inlet tube segment extending between the first inlet tube segment and the second inlet tube segment; and
wherein a longitudinal axis of the third inlet tube segment is slanted relative to the respective longitudinal axes of the first inlet tube segment and the second inlet tube segment.

6. The measuring device of claim 5, wherein the outlet tube includes a third outlet tube segment extending between the first outlet tube segment and the second outlet tube segment; and
wherein a longitudinal axis of the third outlet tube segment is slanted relative to the respective longitudinal axes of the first outlet tube segment and the second outlet tube segment.

7. The measuring device of claim 6, wherein the first distance and the second distance have a same magnitude.

8. The measuring device of claim 1, wherein a first projection of an inner cross section surface of the first inlet tube segment on a projection plane and a second projection of an inner cross section surface of the second inlet tube segment on the projection plane do not intersect in the projection plane;
wherein a third projection of an inner cross section surface of the first outlet tube segment on the projection plane and a fourth projection of an inner cross section surface of the second outlet tube segment on the projection plane do not intersect in the projection plane; and
wherein the projection plane extends parallel to the gravity vector.

9. The measuring device of claim 8, wherein the first projection and the third projection intersect at a first position on the projection plane; and
wherein the second projection and the fourth projection intersect at a second position on the projection plane.

10. The measuring device of claim 1, further comprising:
a first valve disposed relative to the first inlet tube segment and configured to control flow of the medium therethrough; and
a second valve disposed relative to the first outlet tube segment and configured to control flow of the medium therethrough.

11. The measuring device of claim 1, wherein the flowmeter is a nuclear magnetic flowmeter.

12. A method for increasing accuracy of measurements of a flowing medium, comprising: providing a measuring device that includes: an inlet tube with a first inlet tube segment and a second inlet tube segment, the second inlet tube segment directly connected to an inlet end of the measuring tube, the first inlet tube segment positioned above the second inlet tube segment such that respective longitudinal axes of the first inlet tube segment and the second inlet tube segment are separated by a first distance in a direction parallel to a gravity vector; an outlet tube with a first outlet tube segment and a second outlet tube segment, the second outlet tube segment directly connected to an outlet end of the measuring tube, the first outlet tube segment positioned above the second outlet tube segment such that respective longitudinal axes of the first outlet tube segment and the second outlet tube segment are separated by a second distance in a direction parallel to the gravity vector; and an upstream tube directly connected to the inlet tube, the upstream tube having a first upstream tube segment and a second upstream tube segment extending between the first upstream tube segment and the first inlet tube segment, the first upstream tube segment positioned below the measuring tube of the flowmeter; using the flowmeter to carry out first measurements on a portion of the medium flowing through the measuring tube; stopping flow of the medium through the upstream tube, the inlet tube, the measuring tube, and the outlet tube; allowing the measuring device to retain a stagnant portion of the medium that completely fills the measuring tube; using the flowmeter to carry out second measurements on the stagnant portion of the medium that completely fills the measuring tube; and increasing accuracy of the first measurements using the second measurements; wherein the upstream tube is directly connected to the inlet tube such that an entirety of the medium flowing through the upstream tube flows into the first inlet tube segment.

13. The method of claim 12, wherein a siphoning action causes the stagnant portion of the medium to completely fill the measuring tube.

14. The method of claim 12, wherein the medium is a multi-phase medium; and
wherein the first measurements are for at least one of: determining characteristics of individual phases in the multi-phase medium; determining portions of individual phases in the multi-phase medium; and determining flow of individual phases of the multi-phase medium.

* * * * *